(12) United States Patent
Higgins et al.

(10) Patent No.: US 6,259,400 B1
(45) Date of Patent: Jul. 10, 2001

(54) FAST ACQUISITION OF GPS SIGNAL CORRUPTED BY DOPPLER OR TIME DELAY EFFECTS

(75) Inventors: William J. Higgins; John R. Bader, both of Cedar Rapids; Eric D. Nelson, Marion; Mitchell A. Corcoran, Mount Vernon, all of IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/526,016

(22) Filed: Mar. 15, 2000

(51) Int. Cl.$^7$ ............................. H04B 7/185; G01S 5/02
(52) U.S. Cl. ........................... 342/357.06; 342/357.05; 342/357.13; 701/213
(58) Field of Search ................ 342/357.05, 357.06, 342/357.01, 357.09, 357.13; 701/213

(56) References Cited

U.S. PATENT DOCUMENTS 5,786,773 * 7/1998 Murphy ............................ 340/947
6,067,503 * 5/2000 Yakos .................................. 701/213
6,069,584 * 5/2000 Johnson ......................... 342/357.09

* cited by examiner

*Primary Examiner*—Dao Phan
(74) *Attorney, Agent, or Firm*—Nathan O. Jensen; Kyle Eppele; J. P. O'Shaughnessy

(57) ABSTRACT

An RF translator is placed on an artillery shell. The RF translator receives a GPS signal, converts the GPS signal to an S band signal, and then transmits the S band signal. The S band signal is received by a ground antenna and it is converted back to an L1 GPS signal. The transmission of the S band signal to a ground antenna induces two effects which make fast direct P(Y) acquisitions difficult. First, since the artillery shell is moving, a carrier Doppler is induced on the S band signal. Second, the time delay caused by the transmission of the S band signal affects the nominal code phase for acquisition. Acquisition of GPS signals corrupted by second frequency data effects require special compensation if fast direct P(Y) code acquisition is desired. A carrier Doppler and a code phase compensation term allow the GPS ground receiver software to focus its search window for the carrier frequency (code rate) and the code phase (time delay). By adding in these new compensation terms, small centered searches can be used and fast direct P(Y) code acquisition is possible.

32 Claims, 6 Drawing Sheets

FAST ACQUISITION OF GPS SIGNAL CORRUPTED BY DOPPLER OR TIME DELAY EFFECTS

BACKGROUND OF THE INVENTION

1. Field of the Invention

The present invention relates to a method and system for obtaining positioning data of moving objects, for example artillery munitions, and in particular, for improving the acquisition time of GPS signals, including but not limited to, compensating corrupted GPS signals.

2. Background

Methods of precisely locating and controlling rocket-propelled weapons, such as the tomahawk missile, are well known in the art. In a first method, the rocket-propelled weapon is steered from the launch location. After launch, the location of the weapon is known by either sophisticated radar or by placing a positioning device on the weapon. The positioning device relays the weapon's position back to the launch location. The positioning data includes such data as longitude, latitude, and altitude. With this positioning data, the operator at the launch location can steer the weapon to the desired location.

A second method involves placing a computer and a positioning device, such as GPS, inside of the rocket-propelled weapon. Then a predetermined strike location is entered into the on-board computer. After launch, the weapon determines its position from the positioning device. This positioning information is then fed to the on board computer where it is compared with the predetermined strike location. After the computer makes the position comparison, it sends information to the ailerons, elevator, and rudder of the weapon to steer it to the predetermined strike location.

Another method involves programming the topology of the land around a predetermined strike location into the on-board computer. After the launch, the rocket-propelled weapon uses an on-board camera to identify the topography of the land. This visual information is then sent to the computer and compared with the pre-programmed topology information. After the computer makes the topology comparison, it sends information to the ailerons, elevator, and rudder of the weapon to steer it to the predetermined strike location.

In an extension of the concept above, the military is interested in obtaining a precise position of artillery shells. However, using the technologies described above is very costly. This is due to the cost of placing a computer and/or a position-locating device, such as GPS, on board an artillery munition.

GPS is a Department of Defense developed, worldwide, satellite-based radio-navigation system. It will provide primary radio-navigation data well into the next century. The GPS satellite constellation consists of 24 satellites providing two levels of service, Standard Positioning Service, and the Precise Positioning Service.

The Standard Positioning Service (SPS) makes available the GPS L1 frequency, which contains the coarse acquisition (C/A) code and navigation data message. The L1 navigation message contains clock corrections; ephemeris data; satellite health and accuracy; and the identification of the satellite (Almanac data). The SPS is available to all GPS users on a continuous, worldwide basis.

The Precise Positioning Service (PPS) provides accurate military positioning service available to authorized users only. The PPS is provided on the GPS L1 and L2 frequencies. The design of PPS was primarily for U.S. military. P(Y) code capable military users can obtain positioning data much more accurate than that of the C/A code users.

Each of the 24 satellites transmit on two L-band frequencies: L1=1575.42 MHz and L2=1227.6 MHz. The system uses three pseudo-random noise (PRN) ranging codes. The C/A code has a 1.023 MHz chip rate (a period of one millisecond (ms)) and its primary use is to acquire the P-code. The precision (P) code has a 10.23 MHz rate, a period of 37 weeks, restarted every week at the Saturday/Sunday boundary, and is the principal navigation ranging code. The Y-code is used in place of the P-code whenever PPS capability is to be denied to unauthorized users. Each satellite transmits a navigation message containing its orbital elements, clock behavior, and system time and status messages. In addition, almanac data is provided which gives satellite specific data for each active satellite.

An alternative method of tracking munitions involves attaching an RF translator onto an artillery shell. The RF translator receives a GPS signal, as is known in the art, converts it to an S band signal (2266.5 MHz), then transmits the S band signal to a ground antenna at a ground station. The S band conversion is used so that the receiver does not interpret a GPS signal coming from a satellite as one coming from the artillery shell. Furthermore, the conversion to the S band "freezes" the GPS navigation data in time at the exact location of the muniton. The ground antenna then detects the pilot tone identifying the S band signal. Subsequently, the ground station receives the S band signal and converts it back to a GPS signal. The receiver then processes the GPS signal, gathering the navigation data contained on those satellites. Thus, the ground station will know the continuously updated position of the artillery shell up to impact.

The artillery position identifying technique provides an inexpensive alternative; however, problems surface with operation of the system. When the S band signal is transmitted to a ground antenna, it induces two effects, which work against fast GPS signal detection and acquisition difficult. First, the motion of the munition in relation to the ground antenna creates a Doppler effect affecting the code rate. This can slow detection and acquisition of the carrier of the translated GPS signal from the munition. Second, the code position is affected by the time delay created when the translated signal travels from the satellite to the munition to the ground receiver, rather than the normal operating signal traveling from the satellite to the receiver. This can slow acquisition of the GPS information carried in the translated GPS signal from the munition, and thus slow extraction of the pertinent navigation data of the munition.

Because the artillery shell is in the air for a short time (<120 seconds), fast acquisition time is necessary. For fast direct P(Y) acquisitions, the total search area (code phase and carrier frequency errors) must be small. This requires that the pre-positioning data used by the base station (the nominal code phase and nominal carrier frequency, which the receiver uses to assess true code phase and carrier frequency) must be accurate as well.

The S band data link effects influence both the code phase and carrier frequency. In order to perform fast direct P(Y) acquisitions, the receiver should correctly compensate for the S band data link effects.

The carrier Doppler is determined from the equation: Doppler=(Frequency*Velocity)/c (c=Speed of Light). For an artillery shell-positioning program, the maximum velocity of the artillery shell is around 800 m/s. This translates to $800/3\times10^8$=2.7 ppm (parts per million or parts per Megahertz) uncertainty. This uncertainty is 54 times larger than the local clock error (worst case local clock drift is 0.05 ppm). Therefore, the carrier Doppler correction is necessary, because stretching or compression of the carrier frequency will have a proportional effect on the code frequency (e.g., the code rate).

Code phase is determined by time in the GPS week. To properly acquire a GPS signal the code phase of the satellite and the code phase of the receiver must by synchronized. The time delay caused by the S band data link changes the nominal code phase for an acquisition. The artillery shell will have traveled approximately 3.25 to 4.25 seconds (250 ms launch pulse received, 1 sec pilot tone detect, and 2–3 sec for software initialization and noise measurements (See FIG. 6)) before acquisitions can start. Assuming an average velocity of 600 m/sec, the artillery shell will travel approximately 1950 m to 2550m before acquisitions. Converting this distance to p chips (1 p chip≈29.3 m) yields a range of 66 to 87 p chips and is significant given the goal of fast searches. The significance stems from the fact that the code phase of the receiver and the code phase of the satellite must correlate to acquire the GPS signal. A typical receiver searches at a rate of 50 chips/second using two taps. Therefore, if the code phase is off by 66–87 p chips, an extra 1.32–1.74 seconds will elapse before acquisition. The code position should be corrected to compensate for the time delay caused by the travel of the translated signal.

The pre-positioning software needs to add an extra term, carrier frequency Doppler, into the determination of the nominal carrier frequency. The determination of the carrier Doppler stems from position and velocity estimating data (e.g., trajectory model data, radar tracking data or inertial tracking data). The position and velocity estimating data is used to improve acquisition performance. The model provides the GPS ground receiver software with estimated positions of the munition until the ground receiver can acquire a position of the munition itself through the S band data.

The position and velocity data is given for specific time increments, such as milliseconds. The position estimating data is then inputted into the GPS receiver. It should be noted that the velocity estimating data either can be inputted into the receiver or can be derived from the position estimating data. Thus, the receiver will have an estimate of the velocity of the munition at specific periods. Using this velocity estimating data, the GPS software can calculate the new code rate. The use of the velocity term in the position and velocity estimating data is discussed more in the detailed description.

The pre-positioning compensation for the time delay is determined from the position and velocity estimating data also. The position and velocity estimating data informs the receiver approximately, where the munition should be at a specific time after launch. Range from the munition to the ground station is then computed, based upon the known ground station location. This common mode range term is added to the receiver to calculate the time delay created in the S band signal. By knowing the time delay the receiver can adjust its code phase to align with the code phase of the satellite. Thus, the code phase acquisition time is reduced. A further discussion of the time delay is in the detailed description.

Therefore, it is an object of this invention to provide a device to improve the performance speed of search and probability of detection of GPS acquisitions in munitions.

A further object of this invention is to provide new compensation terms in the pre-positioning data in determination of the nominal carrier frequency and the nominal code phase.

A further object of this invention is to provide a carrier frequency Doppler term which compensates for the carrier Doppler effect due to the relative velocity of the munition with respect to the GPS receiver.

A further object of this invention is to provide a common mode range term, which compensates for the time delay effect created by S band translation.

A further object of this invention to provide a method to improve the speed of, and probability of, GPS acquisitions for munitions.

A further object of this invention is to provide a method of inserting new compensation terms in the pre-positioning data to determine of the nominal carrier frequency and the nominal code phase.

A further object of this invention is to provide a method to insert a common mode Doppler term which compensates for the carrier Doppler effect due to the velocity of the munition with respect to the GPS receiver.

A further object of this invention is to provide a method to insert a common mode range term, which compensates for the time delay effect, created by the S band translation.

A further object of this invention is to provide accurate positioning data for munitions to allow future munitions to hit their targets accurately.

A further object of this invention is to insert position and velocity estimating data of a munition into the GPS ground receiver to assist the receiver in finding the munition faster.

A further object of this invention is to use position and velocity estimating data from the munition to create a carrier Doppler compensation term to use in the pre-positioning software of the GPS ground receiver.

A further object of this invention is to use position and velocity-estimating data from the munition to create a common mode range compensation term to use in the pre-positioning software of the GPS ground receiver.

SUMMARY OF THE INVENTION

For a position tracking system, a RF transceiver is attached to a moving object. The RF transceiver receives a GPS signal, converts it to a form distinguishable from the received GPS signal, and transmits the distinguishable signal.

Acquisition of GPS signals corrupted by the distinguishable form of the GPS signal require special compensation if fast direct acquisition is desired. In one embodiment a carrier Doppler and a code phase compensation term allow the GPS ground receiver to focus its search window for the carrier frequency (code rate) and/or more quickly align the code phase misalignment caused by time delay. By adding in one or both of these new compensation terms, small centered searches can be used and fast direct acquisition, such as P(Y) code acquisition, is possible.

DETAILED DESCRIPTION OF THE PREFERRED EMBODIMENT

This discussion is focused on PPS and P(Y) code. However, this does not limit this invention to PPS and P(Y) code as this invention can be used with others, including, but not necessarily limited to, SPS and C/A code.

Figure 1:
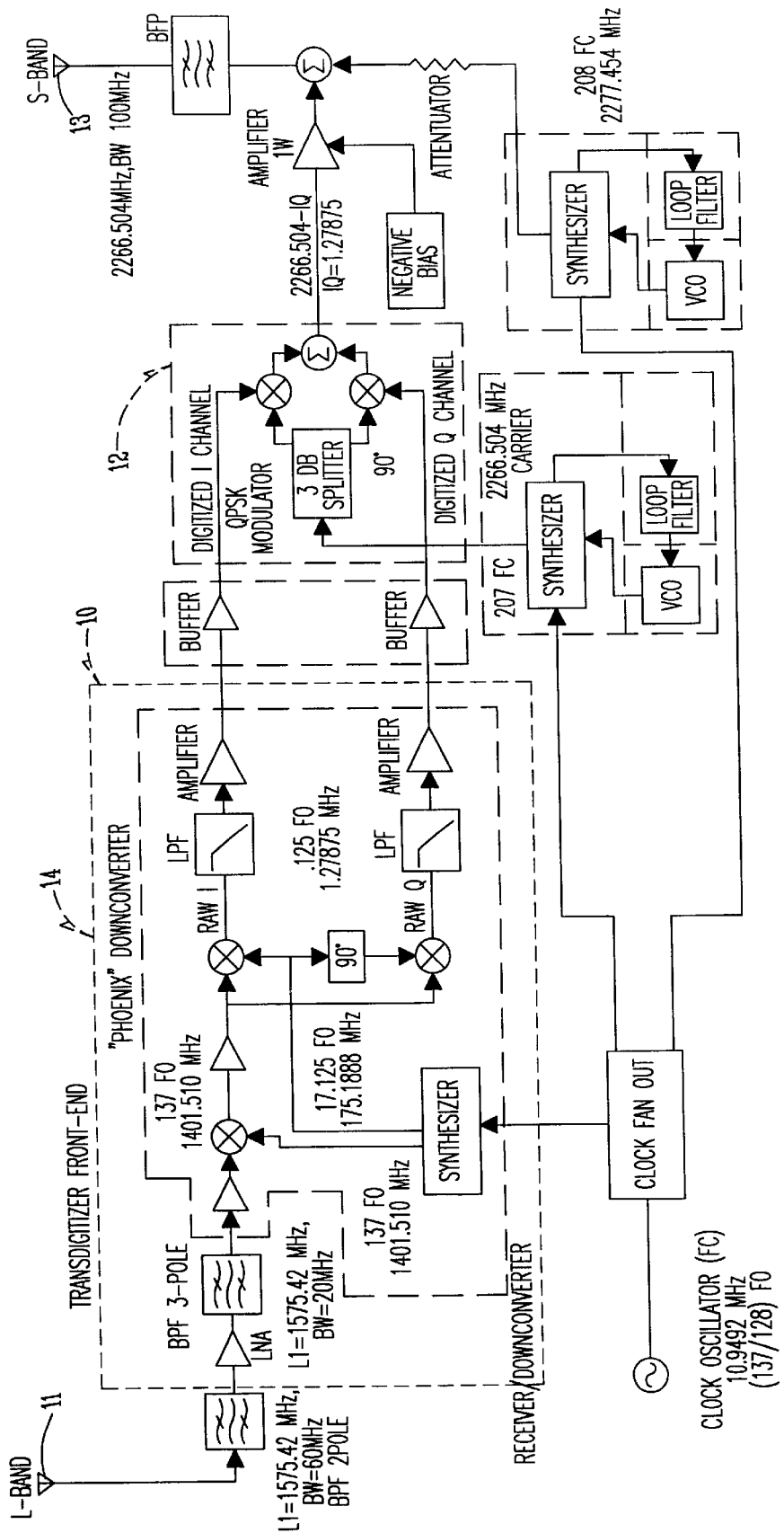
FIG. 1 is a schematic drawing of the RF translator.

In FIG. 1, an RF translator 10 is shown. The translator 10 is responsible for receiving and converting the L1 GPS signal (1575.42 MHz) to the S band (2266.504 MHz). The S band conversion is necessary to prevent the receiver from interpreting a GPS signal coming from a satellite as one coming from the artillery shell. Furthermore, the conversion to the S band "freezes" the GPS navigation data in time at the exact location of the muniton. First, the signal is received via antenna 11 and then down converted via a "phoenix" down-converter 14. Then the signal is converted to the S band signal in the QPSK (Quadrature Phase Shift Keying) modulator 12. The S band signal is then transmitted via antenna 13 to the GPS ground receiver 54.

Figure 2:
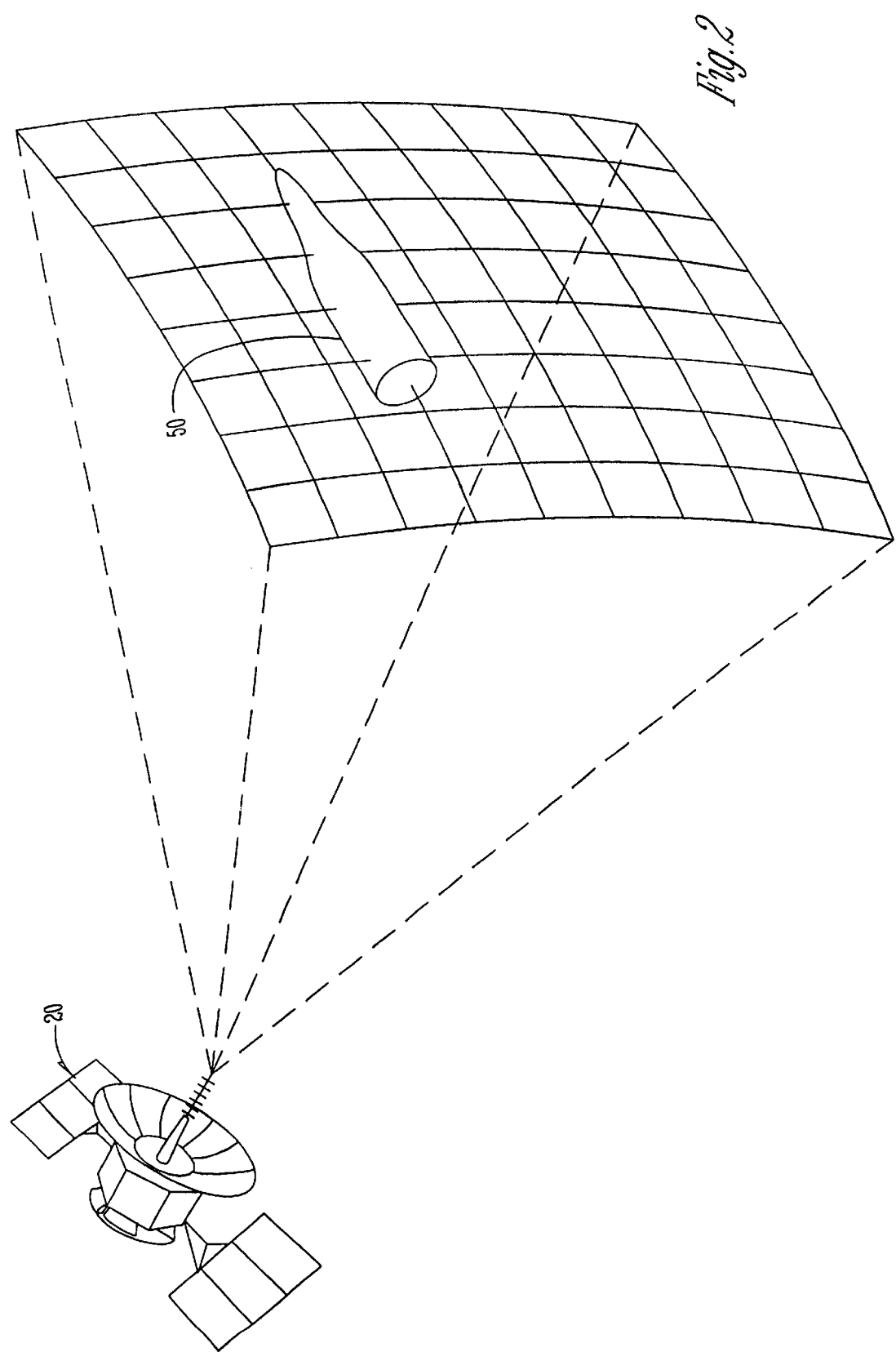
FIG. 2 is a representation of position obtained with one satellite.
Figure 3:
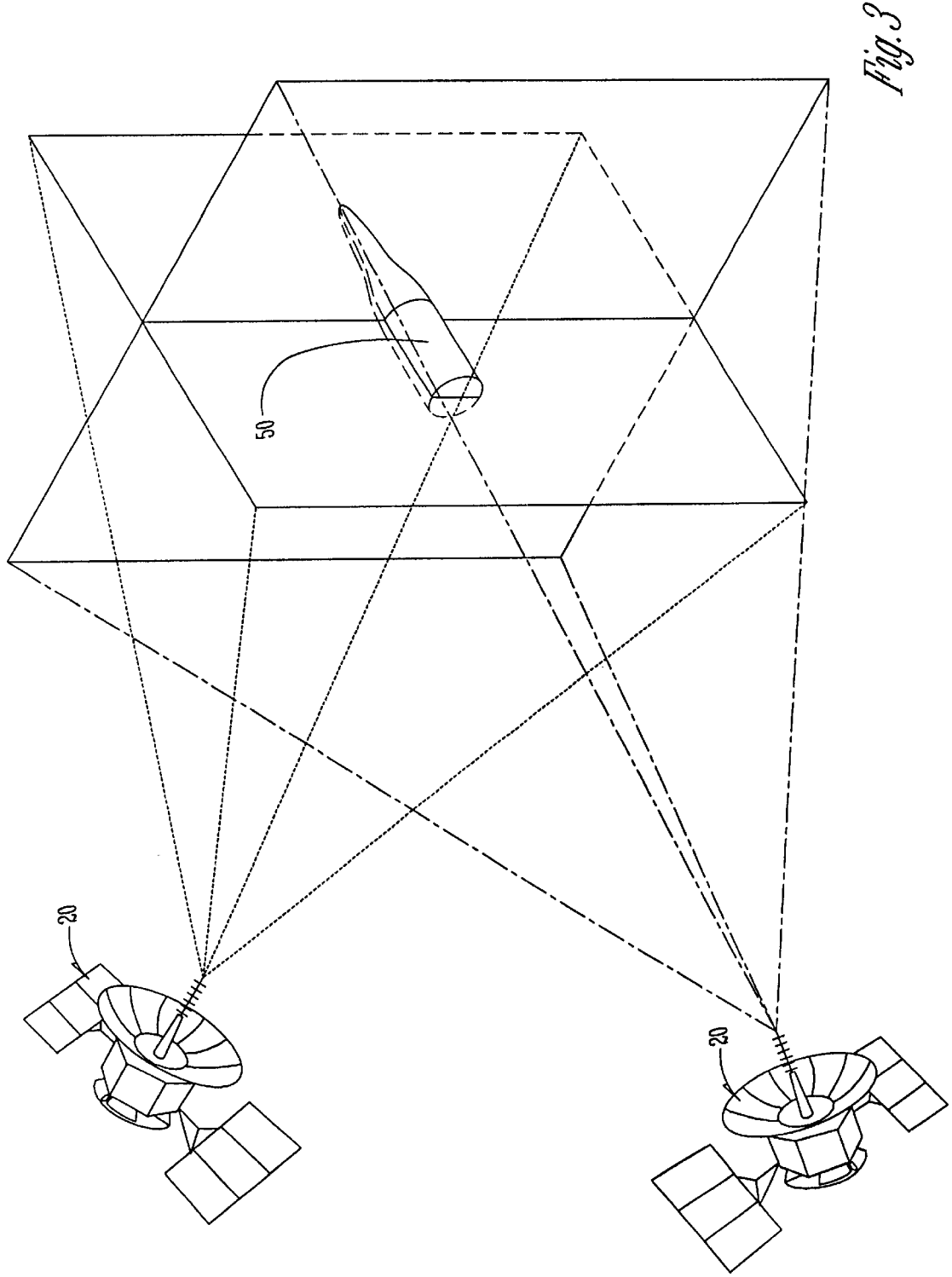
FIG. 3 is a representation of position obtained with two satellites.
Figure 4:
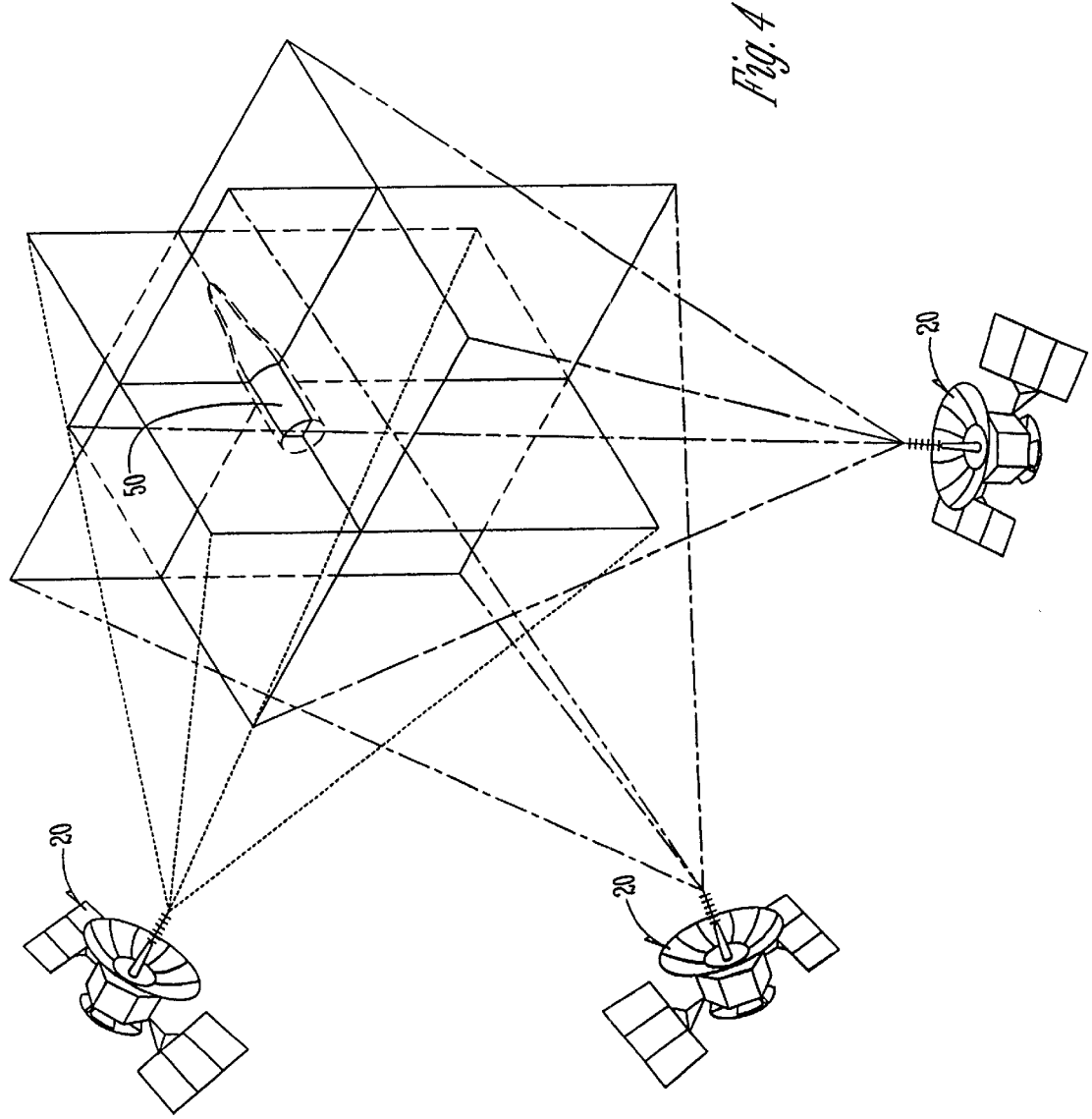
FIG. 4 is a representation of position obtained with three satellites.

The GPS ground receiver 54 preferably uses a minimum of four GPS satellites 20 to calculate a correct position. By referring to FIG. 2, if a munition 50 receives navigation data from one satellite 20, its position can be anywhere on the surface of a sphere having a radius equal to the distance from the satellite to the receiver. In FIG. 3, if a munition 50 receives navigation data from two satellites, its position can be anywhere on a line. In FIG. 4, if a munition 50 receives navigation data from three satellites, then its position is reduced to a point. However, because the local (receiver) clock is not synchronized to the satellite clocks, there are four unknowns (position x, position y, position z, and clock bias (Cb)), therefore, the receiver needs four satellites providing four measurements.

Figure 5:
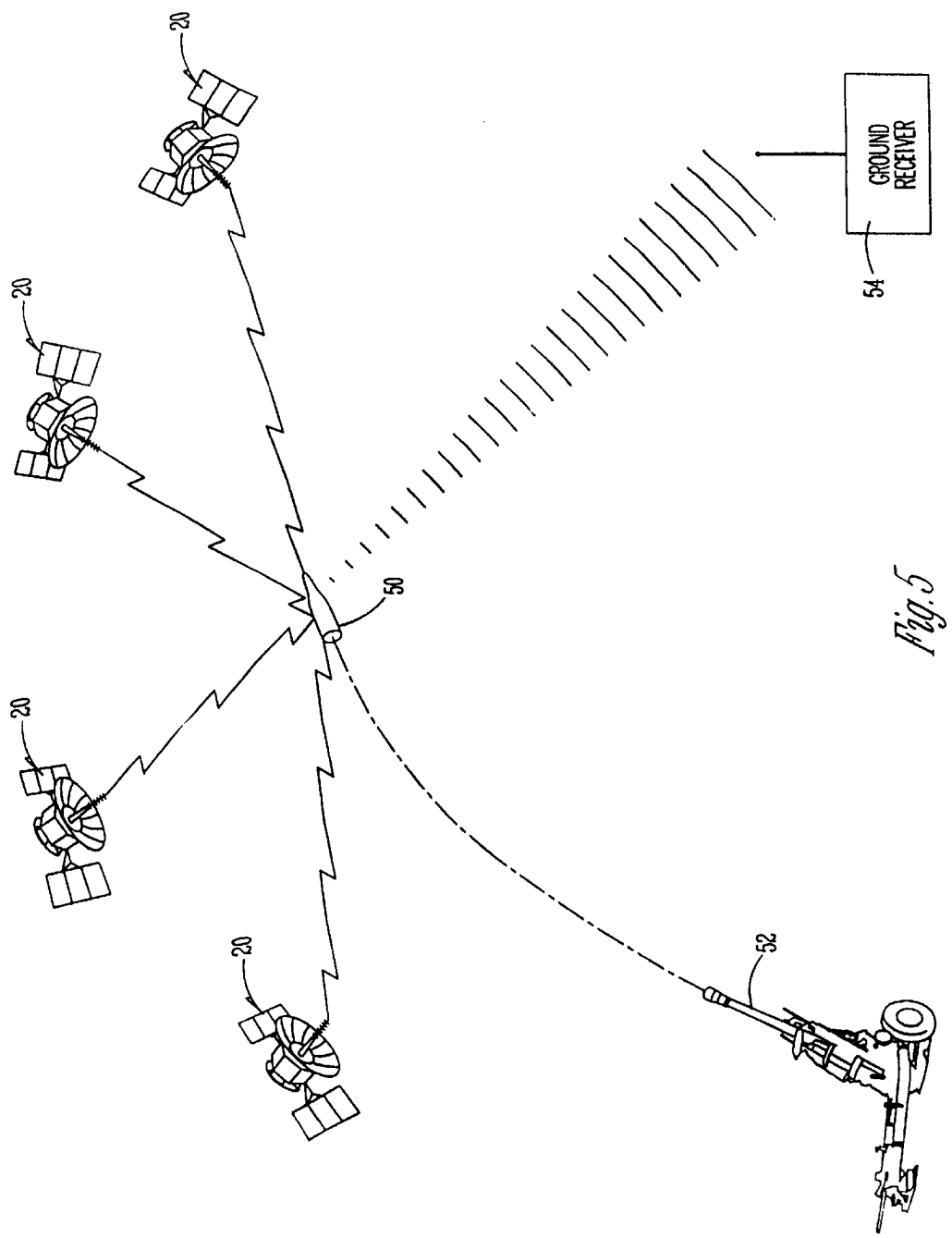
FIG. 5 is a representation of the artillery munition after launch.

In FIG. 5, an artillery munition 50 is launched from an artillery site 52. The munition 50 is now moving away from the GPS ground receiver 54. The munition 50 with the translator 10 located inside has been receiving L1 GPS data and converting it to S band data shortly after launch. Because the munition 50 is moving with respect to the ground receiver 54 there is a Doppler effect created on the S band. The frequency of the S band will actually be different when received by the ground receiver 54. Therefore, the receiver 54 will have to spend time to find what frequency the S band is located. This takes extra acquisition time.

Because a fast direct P(Y) acquisition time is desired, there should be a compensation for the carrier Doppler effect. Therefore, a compensation term is added to the software in the ground receiver 54. To calculate the correction for the code rate, the munition velocity from the velocity estimating data is required. As mentioned above, the velocity estimating data can either be inputted into the receiver or it can be derived from the position estimating data (e.g. from trajectory model such as is well known in the art). The following definitions of some variables are useful.

$f_{code}$=Received frequency of the code.

$F_o$=Nominal frequency of the code.

$V_s$=Is the velocity of the munition relative to the satellite along the line-of-sight from the munition to the satellite.

$V_L$=Is the velocity of the munition along the line-of-sight from the munition to the launcher.

Next, the calculation for the code rate (or carrier Doppler) is performed.

$$f_{code} = 154 F_o * \left(1 + \frac{V_S}{c}\right) * \left(1 + \frac{V_L}{c}\right)$$

$$f_{code} = 154 F_o + \frac{154 F_O V_S}{c} + \frac{154 F_O V_L}{c} + \frac{154 F_O V_S V_L}{c^2}$$

$$f_{code} = f_{LI} + \Delta f_S + \Delta f_L + \Delta \Delta f_{SL}$$

The second order Doppler shift term, $\Delta\Delta f_{SL}$, is satellite dependent, and is small compared to the first order Doppler shifts. If $V_S$=2000 m/s and $V_L$=1000 m/s, $\Delta\Delta f_{SL}$=0.035 cycles=0.0067 m/s. This term can be ignored by the software. Now that the received frequency at the receiver is known a compensation term can be created which forces the receiver to focus its search for the code rate in the correct frequency window. Thus, the search for the Doppler affected frequency is faster and acquisition time is reduced.

The code phase of the receiver 54 and the code phase of the satellite 20 must correlate to acquire the GPS signal. When a GPS signal is received, the receiver tap searches at a chip rate until the receiver code phase is correlated with the satellite code phase. The standard GPS receiver has the time delay between the satellite and the receiver already accounted for in the receiver's software. Therefore, the code phases are already close to each other and acquisition is quick. However, when the signal has to travel to the munition, then be converted to S band, and then retransmitted to the ground antenna, a new time delay is introduced. If this time delay is ignored, then fast direct P(Y) acquisition is difficult. Although most receivers search at a rate of 50 chips/second, the S band time delay can be as much as 66–87 p chips. This translates to 1.32–1.74 second delay in acquisition. By using the position estimating data, a compensation term can be inserted into the software at the ground receiver 54. The following definitions apply.

$R_S$=Is the range from the satellite to the munition.

$R_L$=Is the range from the munition to the ground location.

$D_T$=Is additional transit delay introduced by the translator and down-converter hardware.

b=Is the clock bias of the ground receiver.

D=Is the deterministic corrections.

ρ=Is the post launch pseudo-range.

Next, the calculation for the common range (or code position) is performed.

$$\rho = R_S + R_L + b + D_T + D$$

By knowing the total distance traveled by the GPS signal, the receiver merely divides this number by the speed of light to get the total time delay. By knowing the time delay, the receiver searches a smaller window for code position. Therefore, there is a faster acquisition time.

Figure 6:
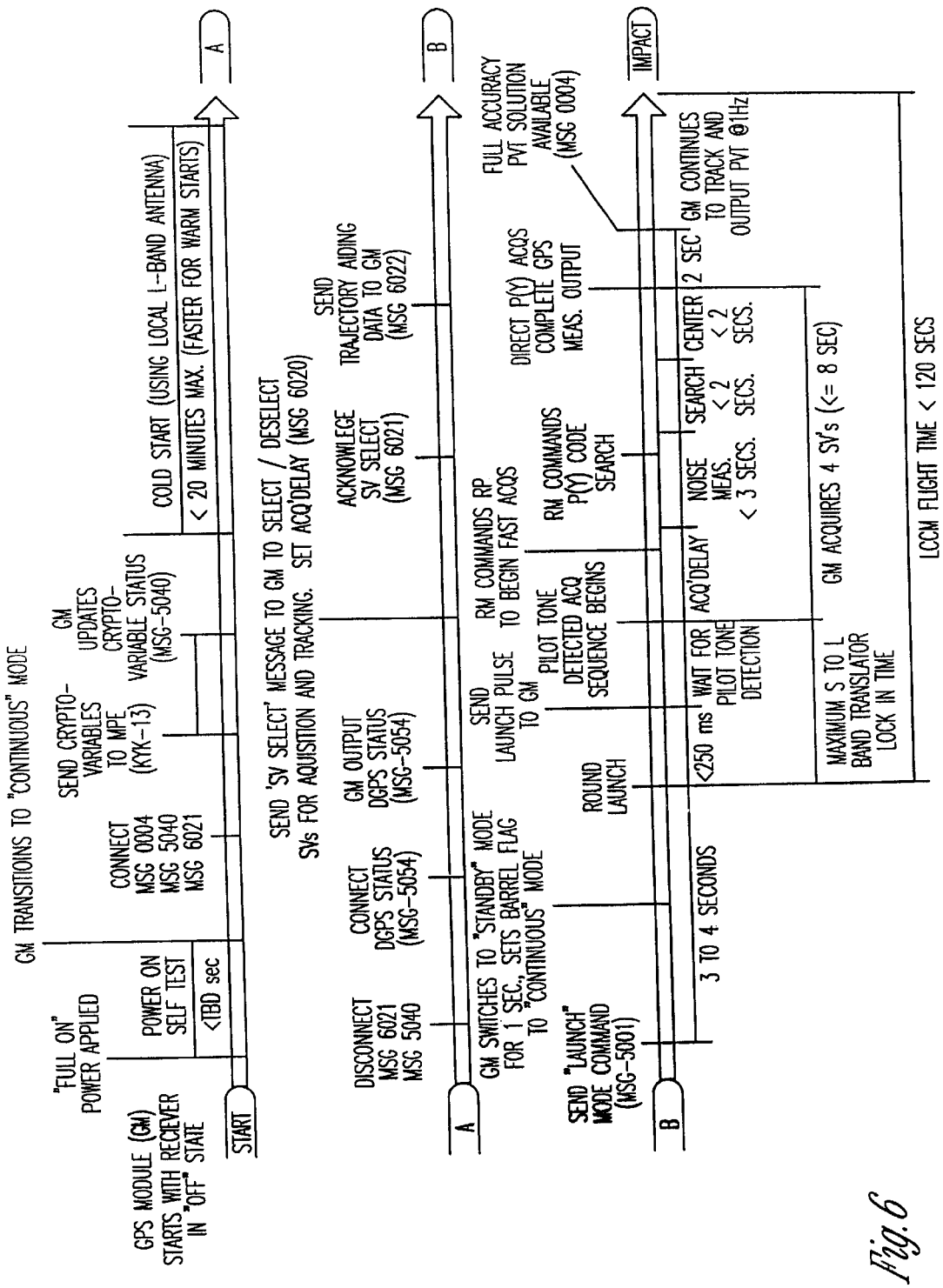
FIG. 6 is a time line representation of a typical launch sequence.

FIG. 6 is a timeline representation of steps taken to quickly locate an artillery munition 50 after firing. First, the launch pulse is received from the artillery launching position 52. This signifies that the munition has been launched. It takes roughly 250 ms. Next, the pilot tone detect is received telling the ground receiver 54 the munition is ready to begin the acquisition sequence. This takes roughly 1 second. Over the next 2–3 seconds, the receiver 54 performs software initialization and noise measurements. The GPS ground receiver software calls either to a memory lookup table, containing the position and velocity estimating data, or this data can be directly inputted into the software after launch in order to know the estimated position of the munition 50. The ground receiver software then makes calculations with the position and velocity estimating data to focus its search windows for the carrier Doppler and code phase. Once the carrier frequency and code phase has been acquired, then tracking of the munition 50 begins. If all is successful, then the receiver 54 has direct P(Y) acquisition in less than or equal to eight seconds and the receiver 54 knows the munition's 50 location.

With the faster acquisition time, the ground receiver 54 is able to send more accurate positioning data to the launch site of the munition. With this information, the launch site is able to correct its positioning to hit the desired target.

The preferred embodiment of the present invention has been set forth in the drawings, specification, and although specific terms are employed, these are used in a generic or descriptive sense only and are not used for purposes of limitation. Changes in the form and proportion of parts as well as in the substitution of equivalents are contemplated as circumstances may suggest or render expedient without departing from the spirit and scope of the invention as further defined in the discussion below and in the claims thereafter.

The following is a specific example of the how the compensation terms would be developed for the receiver processor software.

First to calculate the correction for the code rate, the munition velocity from the trajectory model is required. First, some constants need definition.

$CR_p$ = P code chip rate = 10.23 MHz
$\lambda_p$ = P code wavelength = 29.305225 meters
$\lambda_p = c/CR_p$
v = munition velocity
CR_corr = code rate correction due to common mode doppler The correction and proper scaling for use by the receiver processor software follows.

| | |
|---|---|
| CR_corr = $(CR_p * v)/c$ | (P chips/sec) |
| CR_corr = $[(CR_p * v)/c] * \lambda_p$ | (m/sec) |
| CR_corr = $[(CR_p * v)/c] * (c/CR_p)$ | (m/sec) |
| CR_corr = v | (m/sec) |

There is no common mode doppler effect on code position. However, the code position is affected by the time delay caused by the translated signal traveling from the transceiver transmitting S-band antenna to the ground receiver receiving S-band antenna. At a minimum, the munition will have traveled for 250 ms before acquisitions can begin. Assuming a velocity of 1000 m/sec, the munition will be 250 meters from the artillery launcher.

In the receiver software, the amount of delay will be calculated using the trajectory model and the last calculated navigation position. The distance vector is computed and scaled for use by the receiver processor.

$(X_o, Y_o, Z_o)$ = Last calculated Nav position (base of artillery launcher)
$(X_1, Y_1, Z_1)$ = position of munition form trajectory model data
d = vector between the two points $$d = (X_1 - X_o, Y_1 - Y_o, Z_1 - Z_o)$$
$$\|d\| = \sqrt{(x_1 - x_o)^2 + (y_1 - y_o)^2 + (z_1 - z_o)^2}$$

| | |
|---|---|
| time delay = $\|d\|/c$ | (seconds) |
| time delay = $(\|d\|/c) * (CR_p) * (\lambda_p)$ | (meters) |
| time delay = $\|d\|$ | (meters) |

By using the CR_corr and time delay compensation terms the receiver processor software can compensate for code rate and code phase discrepancies created by transmitting the S-band signal from the munition to the launcher.

What is claimed:

1. A method of improving acquisition of GPS information received from an artillery munition comprising:
   inputting carrier Doppler compensation data into the GPS ground receiver;
   inputting position estimating data for the munition into a GPS ground receiver;
   inputting velocity estimating data into the GPS ground receiver or deriving velocity estimating data in the GPS ground receiver;
   receiving in the artillery munition GPS navigation data, the GPS data having a first frequency;
   shifting the frequency of the GPS data to a second frequency in the munition;
   transmitting the frequency shifted data from the artillery munition to the GPS ground receiver;
   converting the frequency shifted data back to the first frequency at the GPS ground receiver;
   computing the position of the artillery munition from the first frequency data using GPS compensation software.

2. The method of claim 1 wherein the first frequency is a L1 GPS frequency.

3. The method of claim 1 wherein the first frequency is a L2 GPS frequency.

4. The method of claim 2 wherein the L1 frequency contains a C/A and a P pseudo-random ranging code.

5. The method of claim 3 wherein the L2 frequency contains a P pseudo-random ranging code.

6. The method of claim 1 wherein a code phase term is inputted to the GPS receiver software.

7. The method of claim 1 wherein both position and velocity estimating data is trajectory model data.

8. The method of claim 1 wherein the position estimating data is radar tracking data and velocity estimating data is derived in the GPS ground receiver from the radar tracking data.

9. The method of claim 1 wherein the position and velocity estimating data is inertial tracking navigation data.

10. A method of improving acquisition of GPS information received from an artillery munition comprising:
   inputting code phase compensation data into the GPS ground receiver;
   inputting position estimating data for the munition into a GPS ground receiver;
   inputting velocity estimating data into the GPS ground receiver or deriving velocity estimating data in the GPS ground receiver;
   receiving in the artillery munition GPS navigation data, the GPS data having a first frequency;
   shifting the frequency of the GPS data to a second frequency in the munition;
   transmitting the frequency shifted data from the artillery munition to the GPS ground receiver;
   converting the frequency shifted data back to the first frequency at the GPS ground receiver;

computing the position of the artillery munition from the first frequency data using GPS compensation software.

11. The method of claim 10 wherein the first frequency is a L1 GPS frequency.

12. The method of claim 10 wherein the first frequency is a L2 GPS frequency.

13. The method of claim 11 wherein the L1 frequency contains a C/A and a P pseudo-random ranging code.

14. The method of claim 12 wherein the L2 frequency contains a P pseudo-random ranging code.

15. The method of claim 10 wherein a code phase term is inputted to the GPS receiver software.

16. The method of claim 10 wherein both position and velocity estimating data is trajectory model data.

17. The method of claim 10 wherein the position estimating data is radar tracking data and velocity estimating data is derived in the GPS ground receiver from the radar tracking data.

18. The method of claim 10 wherein the position and velocity estimating data is inertial tracking navigation data.

19. A device for improving acquisition of GPS signals from an artillery munition comprising:
   a munition with an RF translator for translating a GPS signal having a first frequency to a second frequency;
   a GPS ground receiver for translating the second frequency to the first frequency;
   the GPS ground receiver having a computer, the computer having a memory, the memory having software that compensates for carrier frequency Doppler effect.

20. The device of claim 19 wherein the first frequency is L1 and the second frequency is an S band frequency.

21. The device of claim 19 wherein the computer memory has software inputted with position and velocity estimating data of the artillery munition.

22. The device of claim 19 wherein the computer memory has software inputted with code phase correction information.

23. The device of claim 21 wherein both position and velocity estimating data is trajectory model data.

24. The device of claim 21 wherein the position estimating data is radar tracking data and velocity estimating data is derived in the GPS ground receiver from the radar tracking data.

25. The device of claim 21 wherein the position and velocity estimating data is inertial tracking navigation data.

26. A device for improving acquisition of GPS signals from an artillery munition comprising:
   a munition with an RF translator, the translator receiving a GPS signal having a first frequency and transmitting a signal having a second frequency;
   a GPS ground receiver for translating the second frequency to the first frequency;
   the GPS ground receiver having a computer, the computer having a memory, the memory having software that compensates for time delay in the code phase.

27. The device of claim 26 wherein the first frequency is L1 and the second frequency is an S band frequency.

28. The device of claim 26 wherein the computer memory has software inputted with position and velocity estimating data concerning the artillery munition.

29. The device of claim 26 wherein the computer memory has software inputted with carrier frequency Doppler correction.

30. The device of claim 28 wherein both position and velocity estimating data is trajectory model data.

31. The device of claim 28 wherein the position estimating data is radar tracking data and velocity estimating data is derived in the GPS ground receiver from the radar tracking data.

32. The device of claim 28 wherein the position and velocity estimating data is inertial tracking navigation data.

* * * * *